Oct. 23, 1951   D. B. BANKS   2,572,799
SYSTEM AND APPARATUS FOR GAS STORAGE CONTROL
Filed May 25, 1950   3 Sheets-Sheet 1

INVENTOR.
DANIEL B. BANKS
BY
Busser and Harding
ATTORNEYS

Oct. 23, 1951  D. B. BANKS  2,572,799
SYSTEM AND APPARATUS FOR GAS STORAGE CONTROL
Filed May 25, 1950  3 Sheets-Sheet 2

INVENTOR.
DANIEL B. BANKS
BY
*Busser and Harding*
ATTORNEYS

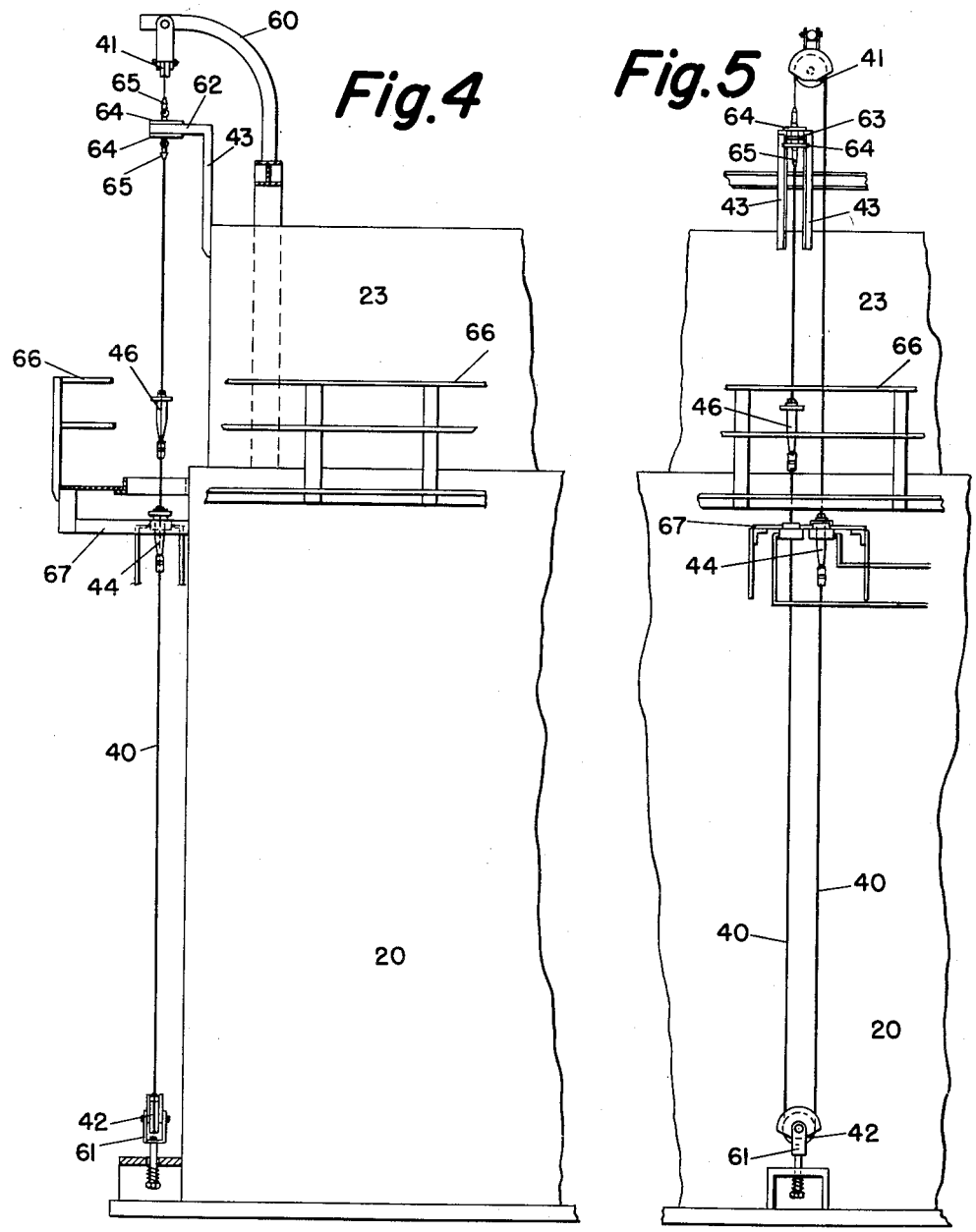

Patented Oct. 23, 1951

2,572,799

UNITED STATES PATENT OFFICE 2,572,799

SYSTEM AND APPARATUS FOR GAS STORAGE CONTROL

Daniel B. Banks, Drexel Hill, Pa., assignor to Sun Oil Company, Philadelphia, Pa., a corporation of New Jersey Application May 25, 1950, Serial No. 164,260

4 Claims. (Cl. 48—190)

This invention relates to a system and apparatus for the storage of gas in a vessel. In particular the invention is directed to the storage of gas in a wet type gas holder which is comprised of a lower tank and an upper bell or gas holder which is movable relative to the tank in accordance with the gas volumes therein. A body of liquid is provided in the tank portion of the vessel and the lower end of the gas holder is normally maintained within the liquid in order to provide a liquid seal and prevent the escape of gas from the vessel.

In industrial operations, for example, operations around an oil refinery, gases, such as flue gas or hydrocarbon gas is generated or produced in one part of the refinery and is stored for later utilization in other operations which are effected from time to time in other parts of the refinery. It is customary to store the produced gas, and hold it in reserve, for later use as required in the other refinery operations or processes. A closed type of pressure vessel may be utilized for the storage of generated gas about an industrial plant but to store the gas in a pressure vessel necessarily causes an increase in pressure with the result that it is difficult to use the high pressure gas from the pressure vessel in other industrial operations. By the utilization of the wet type gas holder incorporating an upper movable gas holder the pressure of the gas supplied to the storage vessel does not increase because of the displacement of the gas holder and the gas in the storage vessel can be taken directly therefrom and utilized as desired in other operations.

This invention is concerned only with gas holders of the wet type and involves a control system wherein the gas holder or bell of the storage vessel is prevented from being raised by the gas in the vessel above a predetermined level in order that its lower end is always maintained within the sealing liquid in the tank portion of the vessel and also to maintain sufficient volume of gas in the holder to prevent its dropping into the tank at a rate or to a level which might cause a vacuum.

A general outline of the control system of the present invention will be helpful in an understanding of the invention. Generated gas, for example flue gas, from a source is supplied in a predetermined volume to the gas holder of a wet type storage tank and a predetermined volume is maintained in the gas holder and as needed the stored gas is removed therefrom and directed to other plant operations, for example, for blanketing vessels such as those used as filtrate storage tanks, wax storage tanks, solvent blend tanks and various other storage tanks. From time to time, some of the gas will be returned from one or more of the processes to the gas holder which will increase the volume of gas in the holder. Under these circumstances it is necessary to prevent the bell of the gas holder from being forced upwardly beyond a predetermined limit in order to prevent breaking the liquid seal with the resultant splashing of liquid from the tank. Some liquids when splashed from the tank could present fire hazards about a plant.

In order to prevent the upward movement of the gas holder beyond a predetermined height an auxiliary source of control fluid is provided and arranged to shut off the supply of generated gas to the holder and additionally to remove from the holder excess gas.

For a clear understanding of the invention, reference may be had to the accompanying drawings in which:

Figure 4 is a side elevational view of a portion of the apparatus.

Figure 5 is a front elevational view of the portion of the apparatus shown in Figure 4.

Figure 1:
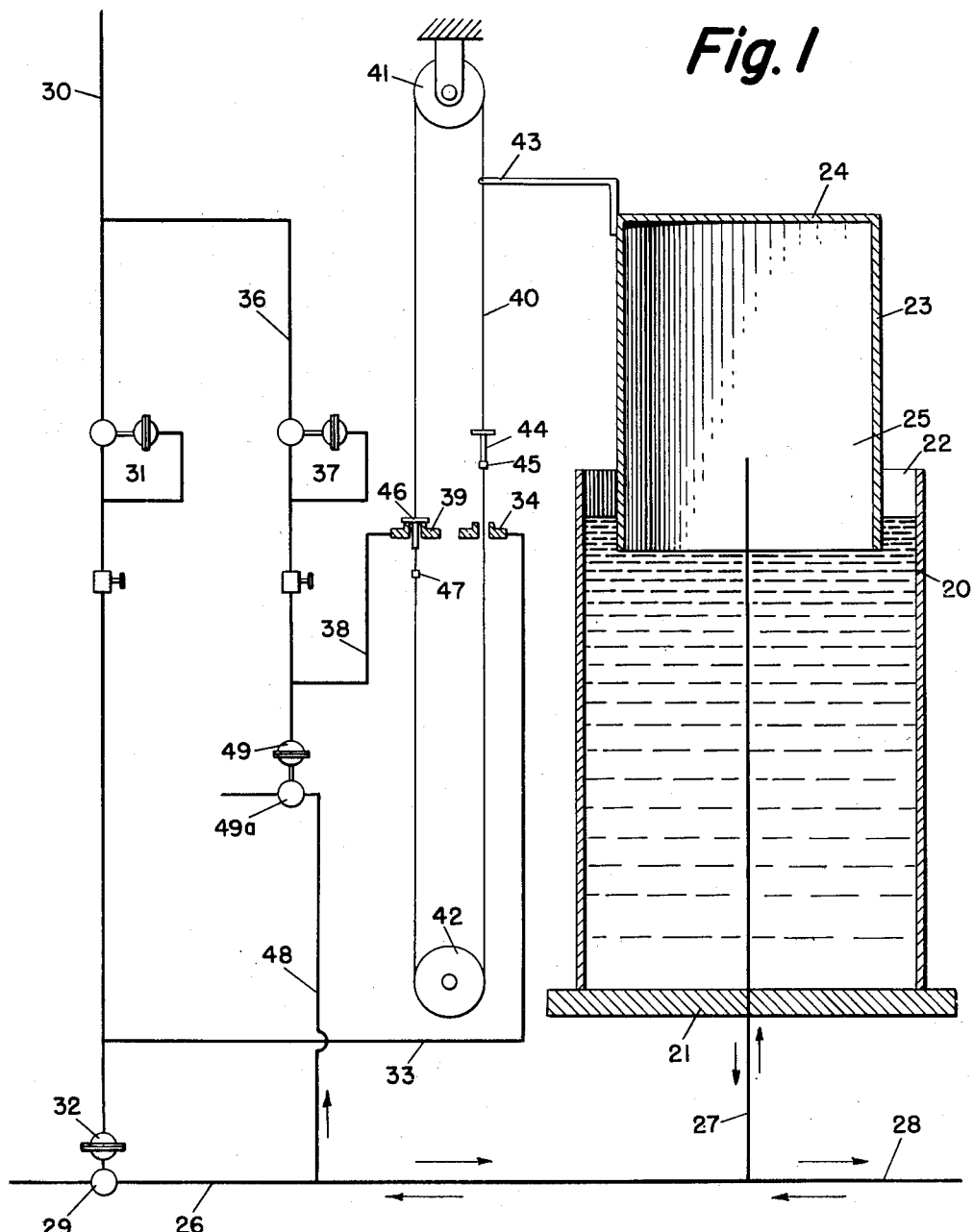
Figure 1 is generally a diagrammatic view with a portion of the apparatus shown in section.

Referring to Figure 1, the numeral 20 indicates the tank of a storage vessel having a closed lower end 21 and an open upper end 22 and containing a body of liquid L. The gas holder or bell of the storage vessel is indicated at 23 and has a closed upper end 24 and an open lower end 25 which is normally disposed within the body of liquid L, in tank 20 providing a liquid seal to prevent the escape of gas. Generated gas from a source is supplied through line 26 to a branch line 27 having an open end positioned within the gas holder 23 and extending above the liquid seal. As required gas stored in the vessel is removed therefrom through the line 27 and directed through line 28 to other equipment (not shown) in order to carry out other plant operations. From time to time the gas utilized in the other processes is returned to the storage vessel through lines 28 and 27.

A predetermined volume of gas will be supplied to the storage vessel from the source through the line 26 and the volume will be regulated through the valve 29 which will be set to some open position to permit the predetermined volume of gas from the source to pass directly to the holder 23 of the storage vessel.

In order to control the operation of valve 29 in the gas supply line 26, an extraneous medium, for example, air from the instrument control line is supplied through line 30. Since the instrument air ordinarily used around a plant or refinery is of high pressure as of the order of 50–100 pounds, it is necessary to reduce the pressure in order to condition it for operation of small valves and to this end a pressure reduction valve 31 is provided in line 30 and a diaphragm 32 is connected in the line 30 which may be set to operate the valve 29 at any desired pressure. Between the pressure reduction valve 31 and the diaphragm 32 a branch line 33 leads to a valve ring 34 which functions normally as a bleed-off valve seat. A second branch line 36 leads from the main supply line 30 and is provided with a pressure reduction valve 37 similar to 31 and after the pressure reduction valve 37 a line 38 branches from the line 36 and leads to another valve ring seat 39 which is similar to valve ring seat 34.

An endless cable 40 is formed into a loop and is movably suspended at its upper end by means of sheave 41 and has its lower end mounted for movement about a sheave 42. A bracket 43 has one end secured adjacent the upper end of the gas holder 23 and the other end is secured to the cable 40 to move the cable in accordance with the upward and downward movement of the gas holder 23. A valve plug 44 is mounted about one strand of the cable 40 in movable relation therewith and a stop 45 is secured in fixed position to this strand of the cable to move the valve plug 44 when it is caused to contact the valve plug 44 through movement of the cable. Similarly a valve plug 46 is freely mounted on the opposite strand of the cable 40 and a cooperating stop 47 is fixed to the cable to move the valve plug 46 during the reverse movement of the cable 40 by the gas holder 23.

Figure 2:
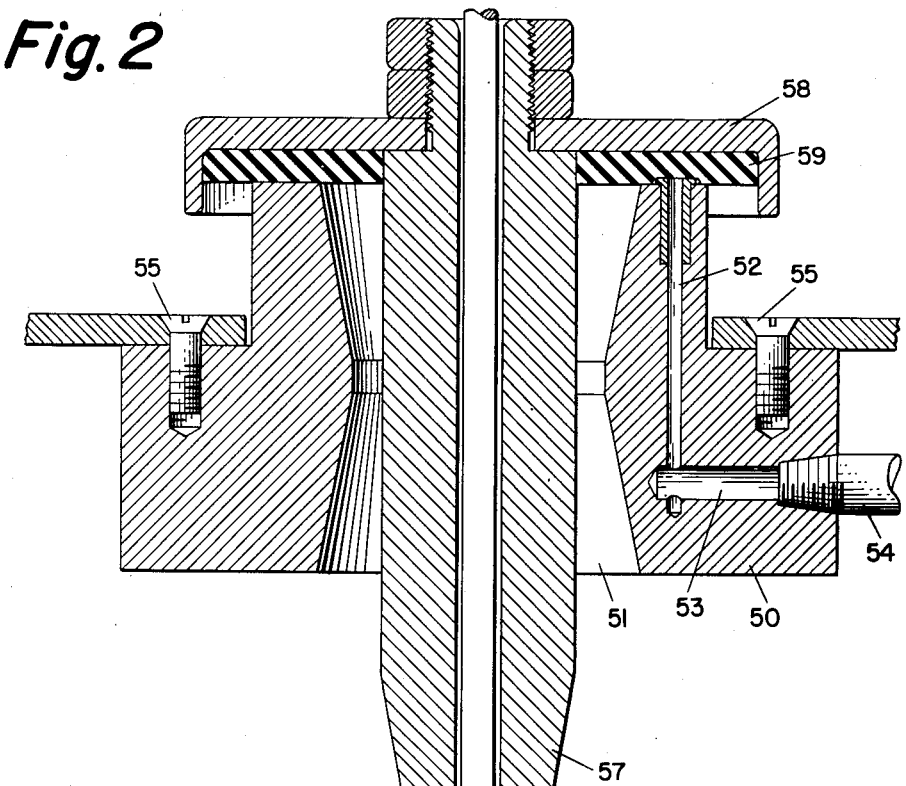
Figure 2 is a view generally in section to show a detail of the invention.
Figure 3:
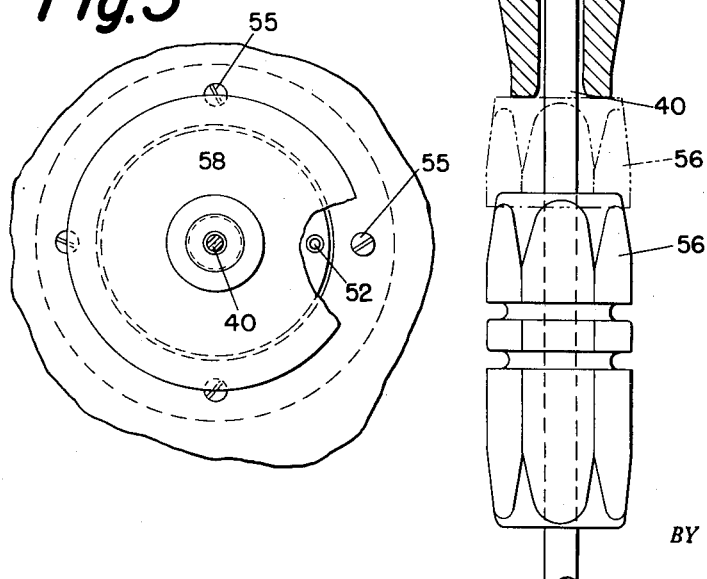
Figure 3 is a plan view of Figure 2 to show details.

Referring to Figure 2, it will be seen that the valve ring seats 34—39 are made up of a cylindrical member 50 which is apertured centrally thereof at 51 and is provided with a vertically drilled portion 52 which communicates with a horizontally drilled portion 53 having a screw threaded inlet end adapted to receive an air conduit 54. The stop members 45—47 are indicated as 56 in this figure and are preferably designed to be removably clamped to the cable 40 in order to permit their being positioned at any desired points on the cable and be movable therewith. The dotted lines indicate that the stop 56 has moved into contact with a valve member. The valve body comprises an elongate tubular member 57 and is freely movable with the cable when in contact with the stop 56. At its upper end the elongate member is provided with a valve cap 58 having a rubber or other soft flexible material 59 disposed therewithin.

In operation the gas supply through the line 26 to the gas holder 23 will be of some predetermined value and the valve 29 will be opened to admit the gas in the desired volume to the gas holder. At this time the gas holder 23 will be moved upwardly but not to its upper limit of movement and the valve 29 will be closed until it is desired to add more gas to the holder, for example, as when gas is removed therefrom for use in other operations. Assume the gas is being removed from the gas holder 23, for example through lines 27 and 28 and used in other process equipment and later the gas is returned to the holder from the other process equipment through lines 28 and 27, then the volume of gas in the holder will increase and the holder 23 will rise with the continued supply of gas thereto until it reaches its upper limit of movement at which time the valve plug 46 will have contacted the valve ring seat 39 cutting off the flow of air through the valve ring causing back pressure in line 38 which actuates through the diaphragm 49 the valve 49a to remove gas from the holder through lines 26 and 48 and thus prevent the holder from going above the danger level. Gas will continue to be removed from the holder 23 through line 27 and line 48 and the holder 23 will gradually move into the liquid in tank 20 and during this downward movement of the holder 23 the valve 44 will follow the stop 45 and move toward the valve ring seat 34 until it is in seating relation therewith at which time the flow of air through the valve ring 34 will cease and back pressure will be built up in line 33 which will through the diaphragm 32 actuate valve 29 to open position and cause gas to be admitted to the holder in a predetermined amount.

It will be understood of course that the cable 40 is actuated through the bracket 43 in a reciprocating movement and the valve plugs 44 and 46 are seated in alternation to alternately stop the passage of air through the valve rings 34 and 39.

Referring to Figures 4 and 5 for the structural details of the apparatus, 20 indicates the tank containing the liquid L while 23 indicates the gas holder. The upper sheave 41 is secured to one end of a davit 60 which has its other end secured to the stationary tank 20. The lower sheave 42 is fixed adjacent the base of the tank 20 through a spring controlled bracket 61 in order to maintain the cable 40 relatively taut. The bracket 43 is bifurcated and has one end secured adjacent the top of the gas holder 23 and its other bifurcated end 62 receives a spool 63 having flanges 64—64 thereon which permits the spool to have some horizontal movement relative to the bracket but prevents the spool from moving vertically. The cable 40 is made endless by means of a double clevis 65—65 arranged to co-act with the spool 63 to raise and lower the cable 40 in accordance with the movement of the gas holder 23.

At 66 is indicated a walk-way about the tank 20 and a plate 67 is secured in fixed position, for example, to the tank 20 and is provided with a pair of openings each for receiving a valve ring seat of the type described in connection with Figure 2. The valve plugs 44 and 46 respectively cooperate with the valve ring seats 34 and 39 to effect the control of the movement of the gas holder 23 as heretofore described.

The gas supply and removal valves 29 and 49a are described as being controlled by air and it will be understood that although other types of energy could be used to control the valves it is preferred to use a pneumatic control since it simplifies the equipment needed.

I claim:

1. In a gas storage apparatus including a tank having a closed lower end with an open upper end containing a body of liquid and a cooperating movable gas holder having a closed upper end with an open lower end normally disposed within the body of liquid providing with the tank a liquid seal, a source of gas and conduit means between said source and said gas holder, the improvement which comprises a gas supply valve and a gas removal valve for controlling gas flow to and from said gas holder, a control device for alternately actuating said gas supply and removal valves to open position, said control device comprising an endless cable, an upper and lower sheave for mounting said cable and forming it into cooperating vertical strands, a bracket arm having one end fixed to a strand of said cable and its other end fixed to said gas holder to reciprocate the cable in accordance with variations in the volume of the gas in the holder, a valve plug for each strand of the cable, each being mounted for movement therewith, a cooperating valve body for each strand of the cable mounted in fixed relation therewith, a source of extraneous control fluid, a control fluid line between the gas supply valve and one of said valve bodies, a control fluid line between the gas removal valve and the other valve body, said valve plugs being actuatable through movement of said cable to close the valve bodies in alternation and alternately effect the supply of gas to and removal of gas from the gas holder.

2. In a gas storage apparatus including a tank having a closed lower end with an open upper end containing a body of liquid and a cooperating movable gas holder having a closed upper end with an open lower end normally disposed within the body of liquid providing with the tank a liquid seal, a source of gas and conduit means between said source and said gas holder, the improvement which comprises a gas supply valve and a gas removal valve for controlling gas flow to and from said gas holder, a control device for alternately actuating said gas supply and removal valves to open position, said control device comprising an endless cable, an upper and lower sheave for mounting said cable and forming it into cooperating vertical strands, a bracket arm having one end fixed to a strand of said cable and its other end fixed to said gas holder to reciprocate the cable in accordance with variations in the volume of the gas in the holder, a valve ring positioned in fixed relationship about each strand of the cable, a source of extraneous control fluid, a control fluid line between the gas supply valve and one of said valve rings, a control fluid line between the gas removal valve and the other valve ring, a valve plug positioned about each strand of said cable to be reciprocable therewith to close the valve rings in alternation and alternately supply gas to and remove gas from the gas holder.

3. In a gas storage apparatus including a tank having a closed lower end with an open upper end containing a body of liquid and a cooperating movable gas holder having a closed upper end with an open lower end normally disposed within the body of liquid providing with the tank a liquid seal, a source of gas and conduit means between said source and said gas holder, the improvement which comprises a gas supply valve and a gas removal valve for controlling gas flow to and from said gas holder, a control device for alternately actuating said gas supply and removal valves to open position, said control device comprising and endless cable, an upper and lower sheave for mounting said cable and forming it into cooperating vertical strands, a bracket arm having one end fixed to a strand of said cable and its other end fixed to said gas holder to reciprocate the cable in accordance with variations in the volume of the gas in the holder, a valve plug for each strand of the cable, each plug being centrally apertured and freely mounted about the cable, a cooperating cylindrical valve body for each strand of the cable, each of said valve bodies being fixed and having a central aperture therein for movement of the cable therethrough, a lug fixed to each strand of the cable and being adapted to move through the central apertures of the valve bodies, a source of extraneous control fluid, a control fluid line between the gas supply valve and one of said valve bodies, a control fluid line between the gas removal valve and the other valve body, said valve plugs being actuated by said lugs through movement of the cable strands to alternately close the valve bodies and control the supply of gas to and the removal of gas from the gas holder.

4. In a gas storage apparatus including a tank having a closed lower end with an open upper end containing a body of liquid and a cooperating movable gas holder having a closed upper end with an open lower end normally disposed within the body of liquid providing with the tank a liquid seal, a source of gas and a main gas conduit therefrom to the gas holder, the improvement which comprises a gas supply control valve in the main gas conduit controlling flow of gas therethrough, a gas outflow conduit connected with the main gas conduit and a gas removal control valve in the gas outflow conduit, a source of extraneous control fluid and fluid inflow conduits therefrom to the gas supply control valve and gas removal control valve respectively, fluid exhaust conduits connected to the fluid inflow conduits respectively, fluid control valves in the respective fluid exhaust conduits, a reciprocable device adapted in its movement in one direction to effect closure of one fluid control valve and the opening of the other fluid control valve and in its movement in the other direction to reverse the closed and open positions of the fluid control valves, and a connection from the gas chamber to said reciprocable device adapted, in the rise or fall of the gas chamber dependent on the direction of gas flow in the main conduit, to move said reciprocable device in opposite directions.

DANIEL B. BANKS.

REFERENCES CITED

The following references are of record in the file of this patent:

UNITED STATES PATENTS

| Number | Name | Date |
|---|---|---|
| 1,029,650 | Wenderoth | June 18, 1912 |
| 1,865,333 | Pendry | June 28, 1932 |
| 1,931,791 | Dueringer | Oct. 24, 1933 |
| 1,934,291 | Baas | Nov. 7, 1933 |